United States Patent
Elie et al.

(10) Patent No.: US 9,732,831 B2
(45) Date of Patent: Aug. 15, 2017

(54) SELF-TENSIONING MEMBER FOR A CABLE OR ROPE

(71) Applicant: Ford Global Technologies, LLC, Dearborn, MI (US)

(72) Inventors: Larry Dean Elie, Ypsilanti, MI (US); John Wayne Jaranson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 14/807,542

(22) Filed: Jul. 23, 2015

(65) Prior Publication Data

US 2017/0023106 A1    Jan. 26, 2017

(51) Int. Cl.

| F16H 7/08 | (2006.01) |
|---|---|
| E05B 79/20 | (2014.01) |
| F16C 1/22 | (2006.01) |
| E05B 15/04 | (2006.01) |
| E05B 81/06 | (2014.01) |
| E05B 81/16 | (2014.01) |
| E05B 81/20 | (2014.01) |

(52) U.S. Cl.
CPC .............. *F16H 7/08* (2013.01); *E05B 15/04* (2013.01); *E05B 79/20* (2013.01); *F16C 1/223* (2013.01); *E05B 81/06* (2013.01); *E05B 81/16* (2013.01); *E05B 81/20* (2013.01); *F16C 2350/52* (2013.01); *F16H 2007/0842* (2013.01)

(58) Field of Classification Search
CPC .... F16H 2007/0842; F16H 7/08; B60J 5/047; E05F 15/622; E05F 15/611

USPC ..................................... 49/352, 360
See application file for complete search history.

(56) References Cited

U.S. PATENT DOCUMENTS

| 2,319,684 | A | | 5/1943 | Horton |
|---|---|---|---|---|
| 2,373,775 | A | | 4/1945 | Neely et al. |
| 2,438,101 | A | * | 3/1948 | Wright ................... E06B 9/326 |
| | | | | 24/129 B |
| 2,466,083 | A | * | 4/1949 | Crosby ................. H02G 7/056 |
| | | | | 24/129 B |
| 2,676,647 | A | | 4/1954 | Smith |
| 2,775,997 | A | | 1/1957 | Kubacka |
| 2,835,314 | A | | 5/1958 | Neely |
| 2,835,315 | A | | 5/1958 | Neely |
| 2,855,985 | A | | 10/1958 | Neely |
| 3,285,598 | A | | 11/1966 | Gutzman |
| 3,372,406 | A | | 3/1968 | Heckethorn |
| 3,782,220 | A | * | 1/1974 | Ditlinger ................. F16C 7/026 |
| | | | | 416/134 A |
| 4,462,185 | A | * | 7/1984 | Shibuki ............... E05D 15/1081 |
| | | | | 49/218 |

(Continued)

*Primary Examiner* — Gregory Strimbu
(74) *Attorney, Agent, or Firm* — Jason C. Rogers; Price Heneveld LLP

(57) ABSTRACT

A tensioning assembly for a vehicle door includes a spring member disposed in the vehicle door and includes a sinusoidal configuration defined by a plurality of linear members having ends coupled by a plurality of arcuate members. A cable extends through the spring member in the door. The cable is interlaced with the linear member and includes a first end being operably coupled with a pulley wheel. An intermediate portion of the cable is wrapped around a drive wheel. A second end of the cable is operably coupled with the pulley wheel. A plurality of locating nubs on the linear members locate the cable through the spring member.

17 Claims, 5 Drawing Sheets

(56) References Cited

U.S. PATENT DOCUMENTS

| | | | | |
|---|---|---|---|---|
| 4,918,865 | A * | 4/1990 | Hirai | E05F 11/06 403/383 |
| 5,188,344 | A * | 2/1993 | Dabney | A47C 23/02 267/103 |
| 5,210,973 | A * | 5/1993 | Kratky | A01G 9/128 47/44 |
| 5,314,065 | A * | 5/1994 | Ayres | F16B 15/0015 206/340 |
| 5,924,682 | A | 7/1999 | Bullard | |
| 5,927,491 | A * | 7/1999 | Room | F16B 15/08 206/340 |
| 6,616,229 | B2 * | 9/2003 | Kuster | B60N 2/4492 297/284.2 |
| 9,199,560 | B2 * | 12/2015 | Line | A47C 7/22 |
| 2003/0232677 | A1 * | 12/2003 | Huang | F16H 7/08 474/101 |
| 2011/0004371 | A1 * | 1/2011 | Bullard | A47C 7/285 701/36 |

* cited by examiner

SELF-TENSIONING MEMBER FOR A CABLE OR ROPE

FIELD OF THE DISCLOSURE

The present disclosure generally relates to a tensioning assembly for a cable used in a vehicle.

BACKGROUND OF THE DISCLOSURE

Vehicles frequently incorporate cable systems used in conjunction with moving parts of the vehicle. For example, door handles and latch assemblies may include spring-biased or motorized systems to assist in returning the handle to a standard position or returning a latch to an unlatched position. The cables can become relaxed over time. Cable and pulley systems are frequently used in vehicles for a variety of applications. Unfortunately, over time, cables can become relaxed, and therefore not as taut as they otherwise should be during use.

SUMMARY OF THE DISCLOSURE

According to one aspect of the present disclosure, a tensioning assembly for a vehicle door includes a spring member disposed in the vehicle door and includes a sinusoidal configuration defined by a plurality of linear members having ends coupled by a plurality of arcuate members. A cable extends through the spring member in the door. The cable is woven over every other linear member and includes a first end being operably coupled with a pulley wheel. An intermediate portion is wrapped around a drive wheel. A second end is operably coupled with the pulley wheel. A plurality of locating nubs on the linear members locate the cable through the spring member.

According to another aspect of the present disclosure, a tensioning assembly for a vehicle door includes a spring member disposed in the vehicle door and having a sinusoidal configuration defined by a plurality of linear members having ends coupled by a plurality of arcuate members. A cable extends through the spring member. The cable is woven over every other linear member. A plurality of locating nubs on the linear members locate the cable through the spring member.

According to still another aspect of the present disclosure, a tensioning assembly for a vehicle door includes a cable having a first end coupled to a pulley wheel, an intermediate portion extending around a motorized drive wheel, and a second end coupled with the pulley wheel. First and second spring members each have a sinusoidal configuration defined by a plurality of linear members coupled by a plurality of arcuate members. The cable is woven through each spring member.

According to yet another aspect of the present disclosure, a tensioning assembly for a vehicle door includes a spring member designed to maintain a consistent tension force on a cable. The spring member provides an efficient low-cost solution to maintaining a steady tension on the cable, thereby increasing the overall life of the cable in the tensioning assembly.

According to yet another aspect of the present disclosure, a tensioning assembly for a vehicle includes a spring member configured to apply a constant tensile loading on a cable, resulting in the cable having a satisfactory tautness for a longer period of time than has been traditionally obtained before.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
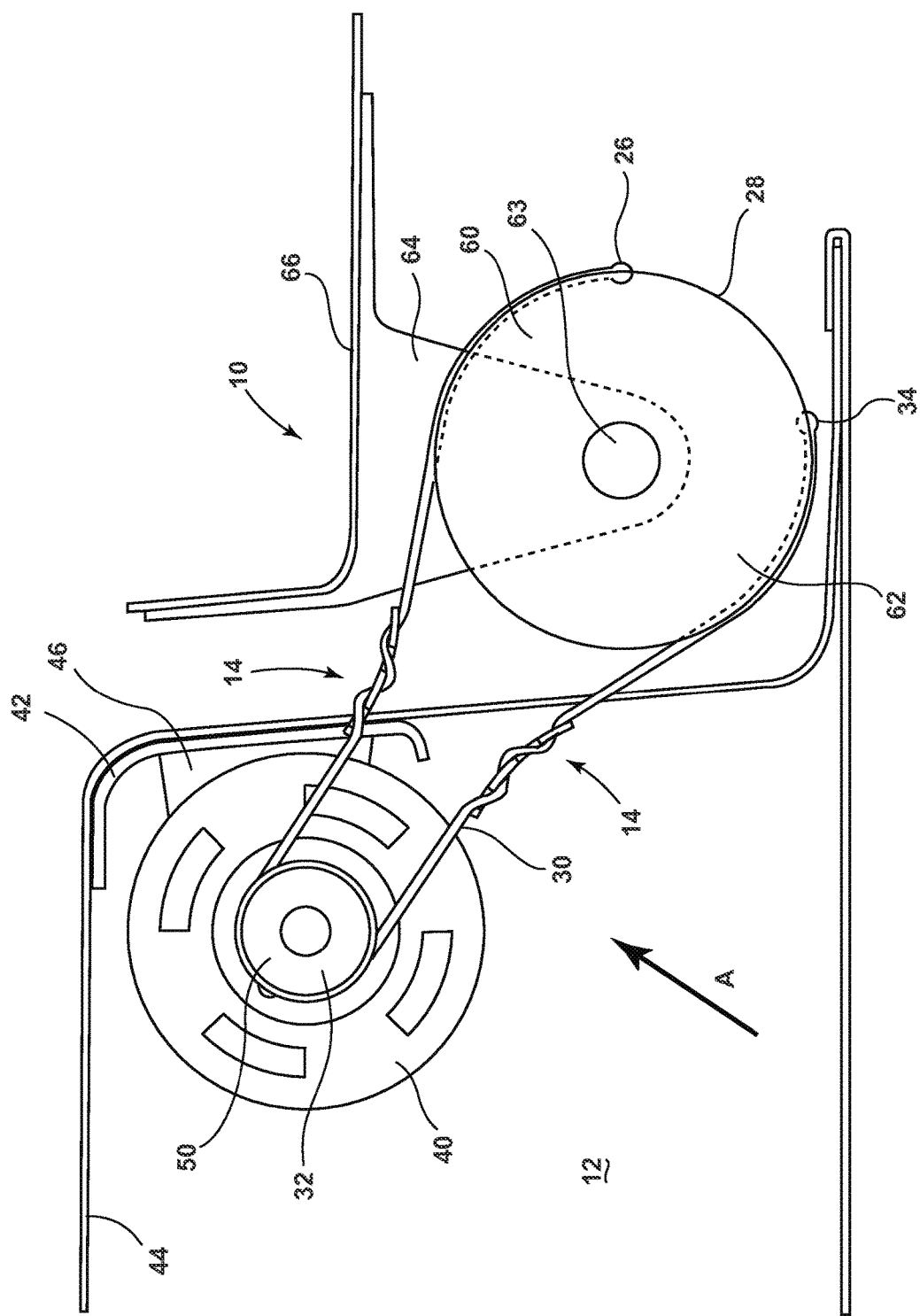
FIG. 1 is a front elevational view of one embodiment of a tensioning assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-8, reference numeral 10 designates a tensioning assembly for a vehicle door 12 and includes a spring member 14 disposed in the vehicle door 12 and having a sinusoidal configuration defined by a plurality of linear members 18 having ends 20 coupled by a plurality of arcuate members 22. A cable 24 extends through the spring member 14 in the door 12. The cable 24 is woven over every other linear member 18 and includes a first end 26 being operably coupled with a pulley wheel 28. An intermediate portion 30 is wrapped around a drive wheel 32. A second end 34 is operably coupled with the pulley wheel 28. A plurality of locating nubs 36 on the linear members 18 locate the cable 24 through the spring member 14.

With reference again to FIGS. 1 and 2, the illustrated tensioning assembly 10 for use in a vehicle includes a motor or actuator 40 that is operably coupled with an inner door reinforcement 42. The inner door reinforcement 42 is operably coupled with a door inner panel 44. Although it is contemplated that the motor or actuator 40 may be configured for use with soft close or power door features, it is generally contemplated that the motor or actuator 40 could be used in a variety of different applications in vehicle doors or other areas of the vehicle. The motor or actuator 40 is operably coupled with the inner door reinforcement 42 via a support flange 46. The support flange 46 supports the motor or actuator 40 in position inside the door 12. The motor or actuator 40 includes the drive pulley (or drive wheel) 32 extending therefrom. The drive pulley 32 is disposed over a drive shaft 50 operably coupled with the motor or actuator 40. The drive shaft 50 is configured to rotate, which consequently results in rotation of the drive pulley 32.

The cable 24, as illustrated, wraps about the drive pulley 32 three times. However, it will be understood that the cable 24 may wrap about the drive pulley 32 more or less than three times, and may in fact, simply wrap about a portion of the drive pulley 32 and not wrap entirely around the drive pulley 32. In one embodiment, the cable 24 wraps around the drive pulley 32 at least two times. The first end 26 of the cable 24 extends around a first side 60 of the pulley wheel 28. The second end 34 of the cable 24 extends around a second side 62 of the pulley wheel 28 and is fixedly coupled therewith. The pulley wheel 28 acts as a driven pulley that is manipulated by the drive pulley 32. The pulley wheel 28 includes an axle 63 that is operably coupled with a hinge pillar bracket 64. The hinge pillar bracket 64 couples the pulley wheel 28 to a body hinge pillar 66. The body hinge pillar 66 maintains the general positioning of the pulley wheel 28 relative to the motor or actuator 40 as well as the drive pulley 32.

During assembly, the pulley wheel 28 is positioned a predetermined distance from the drive pulley 32 and the motor or actuator 40 such that the cable 24 maintains a predetermined appropriate amount of tension on both the pulley wheel 28 and the drive pulley 32. However, after continued use, the cable 24 can become slack or relaxed, which can result in failures of the system generally. Accordingly, tensioner springs in the form of spring members 14 are applied to the cable 24 at locations that will not generally interfere with or engage with the drive pulley 32 or the pulley wheel 28. In the illustrated embodiment shown in FIGS. 1 and 2, an upper spring 14 and a lower spring 14 are present on the cable 24. Each of the spring members 14 include a sinusoidal configuration, wherein the cable 24 extends through the spring member 14. As a result of the undulations and general 2D construction of the spring member 14, the cable 24 is forced to undulate above and below each of the linear members 18. Consequently, tension can be maintained in the cable 24 for a lengthened period of time than if the spring member 14 was absent. The spring member 14 acts to apply a constant spring force on the cable 24.

With reference again to FIGS. 1 and 2, the illustrated embodiment includes two spring members 14, both on the intermediate portion 30 of the cable 24. The tensioner springs act to provide a tensile spring bias on the cable 24.

Figure 2:
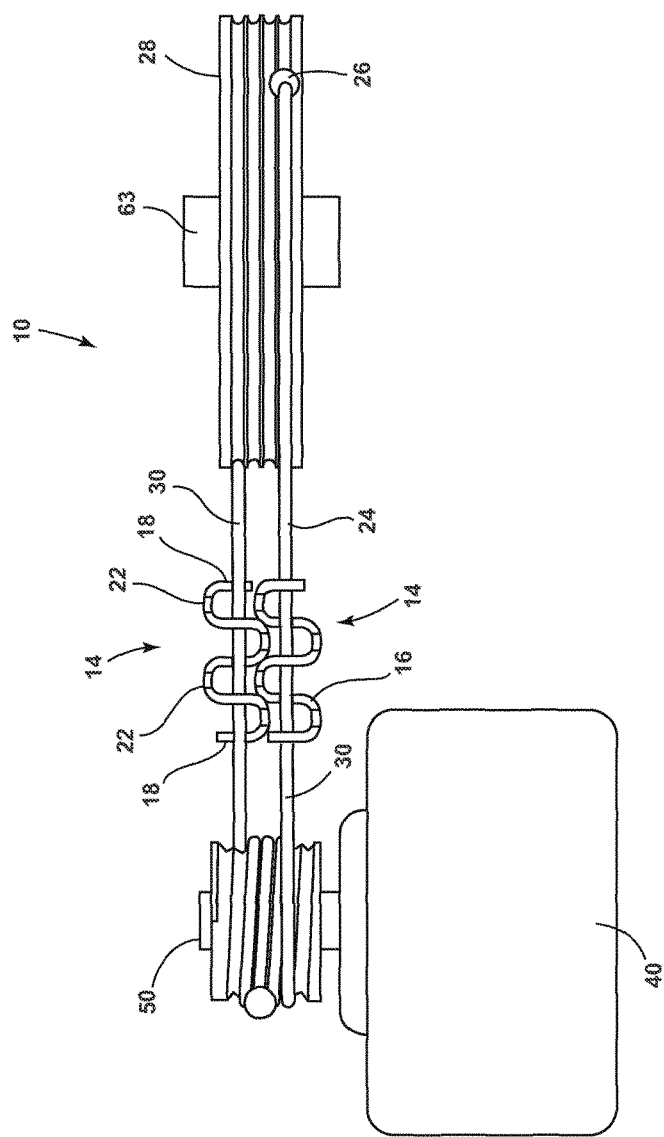
FIG. 2 is a top plan view of the tensioning assembly illustrated in FIG. 1.
Figure 6:
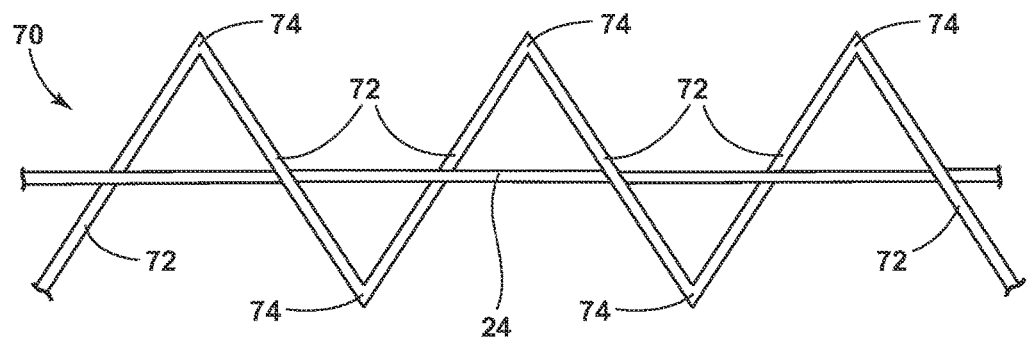
FIG. 6 is a top plan view of another spring member of the present disclosure.
Figure 7:
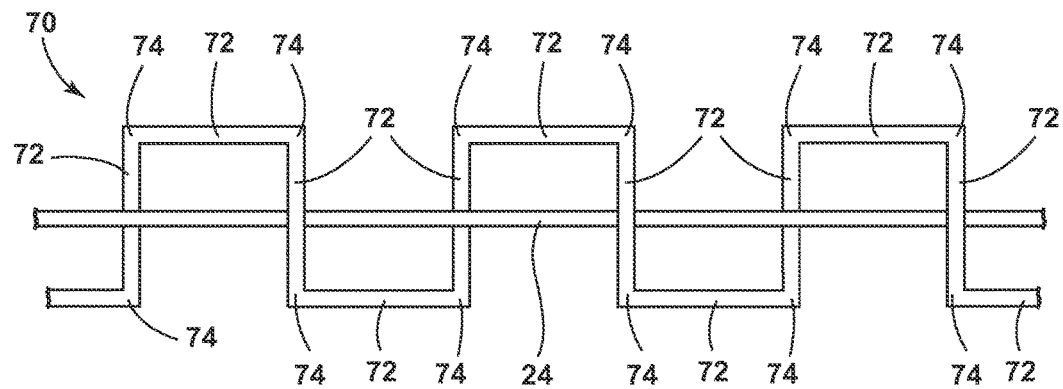
FIG. 7 is a top plan view of yet another spring member of the present disclosure.
Figure 8:
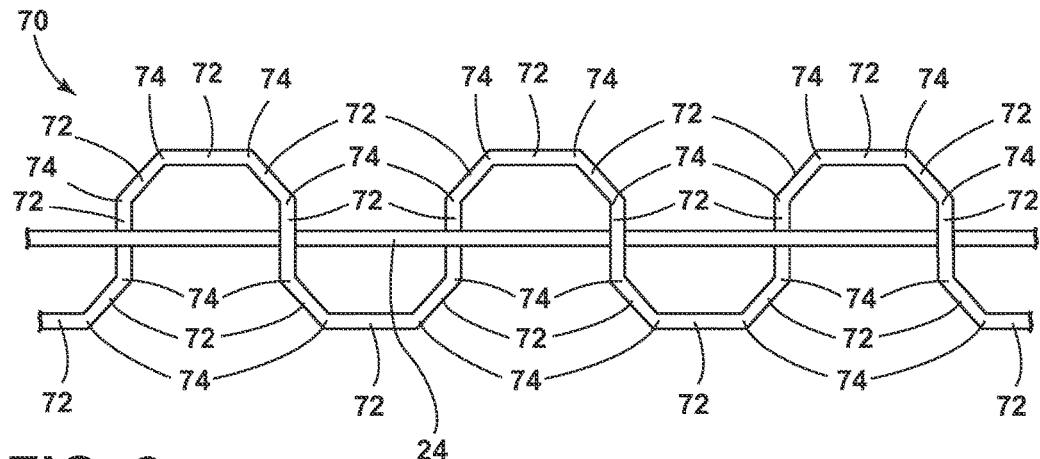
FIG. 8 is a top plan view of still another spring member of the present disclosure.

As shown in FIG. 2, the spring members 14 include five linear members 18 and four arcuate members 22. However, it will be understood that any number of linear members 18 and any number of arcuate members 22 may be present in the spring member 14 when applied to the tensioning assembly 10 generally. Additionally, it is generally contemplated that the sinusoidal configuration of the spring members 14 may be replaced with a spring member 70 having only linear members 72 in a zig-zag style configuration, as illustrated in FIG. 6. In this instance, the spring member 70 includes only linear members 72 that are connected to one another at ends 74. Other arrangements, including square or polygonal connecting of linear members 72 at ends 74, are also possible, as illustrated in FIGS. 7 and 8.

In use, when the drive pulley 32 is activated via the motor or actuator 40, one of the first and second spring members 14 will move toward the drive pulley 32, while the other of the spring members 14 will move toward the pulley wheel 28. When the desired function has been obtained, the first and second spring members 14 will return to their original position relative to the drive pulley 32 and the pulley wheel 28. Notably, any number of spring members 14 could be positioned on the cable 24, generally in a manner such that they do not interfere with the drive pulley 32 or the pulley wheel 28.

Figure 3:
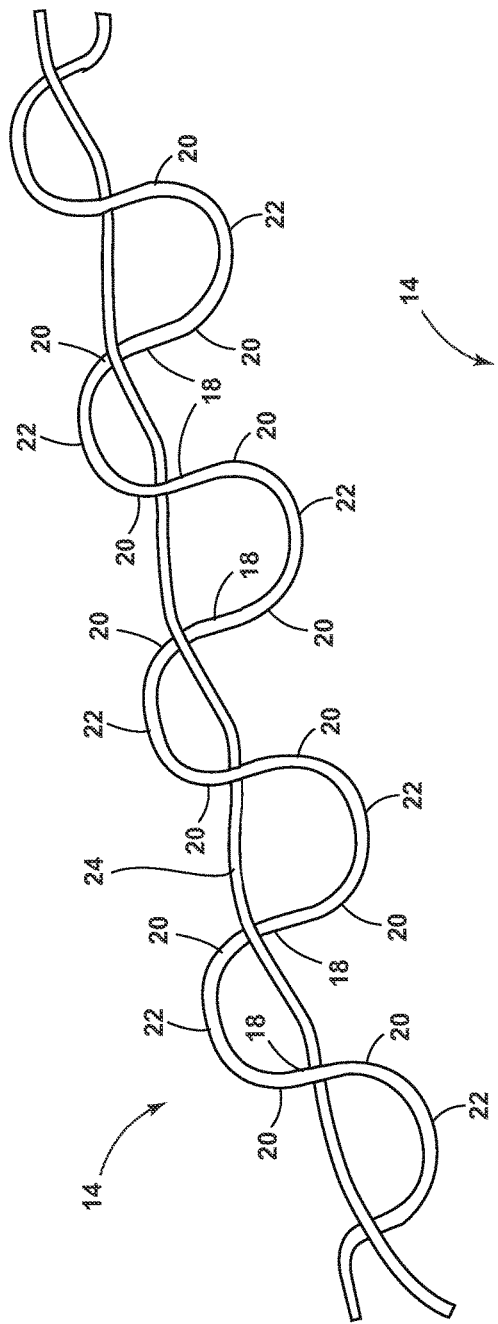
FIG. 3 is a top plan view of a cable woven into a spring member of the present disclosure.
Figure 4:
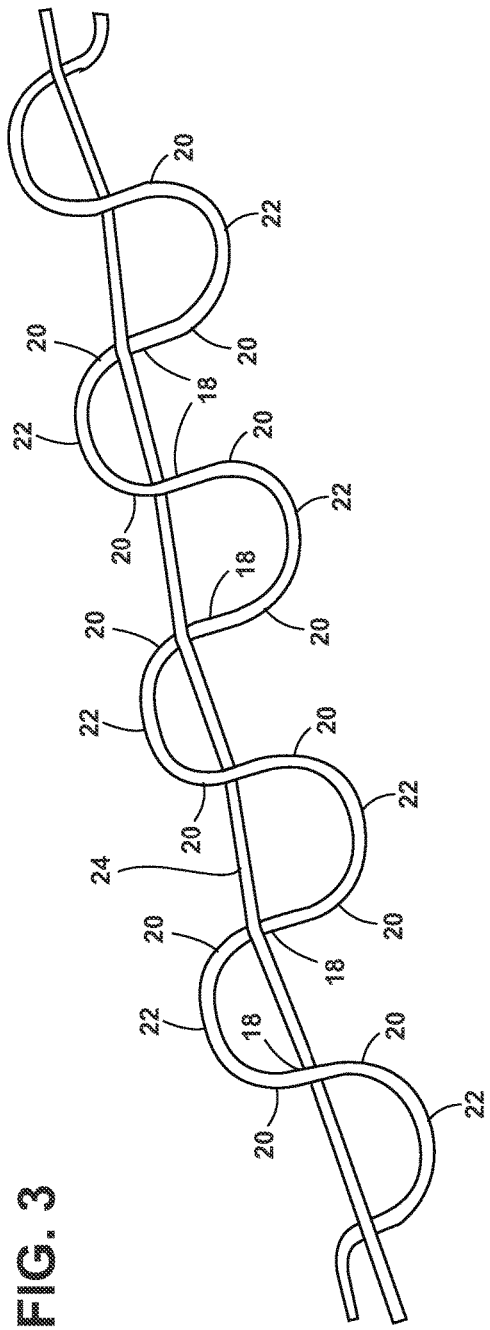
FIG. 4 is a top perspective view of the cable and spring member after a tensile load has been applied to the cable.

With reference now to FIGS. 3 and 4, prior to installation, the cable 24 is woven above and below adjacent linear members 18 of the spring member 14. As the cable 24 is woven, a greater length of the cable 24 is needed to extend a predetermined distance. Stated differently, because the cable 24 is woven above and below adjacent linear members 18 of the spring member 14, more of the cable 24 is needed to extend across the same distance than if the spring member 14 was not present. The cable 24 is then tightened, as shown in FIG. 4, and the first end 26 of the cable 24 is coupled with the first side 60 of the pulley wheel 28. The intermediate portion 30 is wrapped around the drive wheel 32 to a predetermined number of times, and the second end 34 of the cable 24 is operably coupled with the second side 62 of the pulley wheel 28. In the event there are two spring members 14, the second spring member 14 is installed in a similar fashion. Also, in the illustrated embodiment, a diameter of a cross-section of the spring member 14 is less than a diameter of a cross-section of the cable 24.

Figure 5:
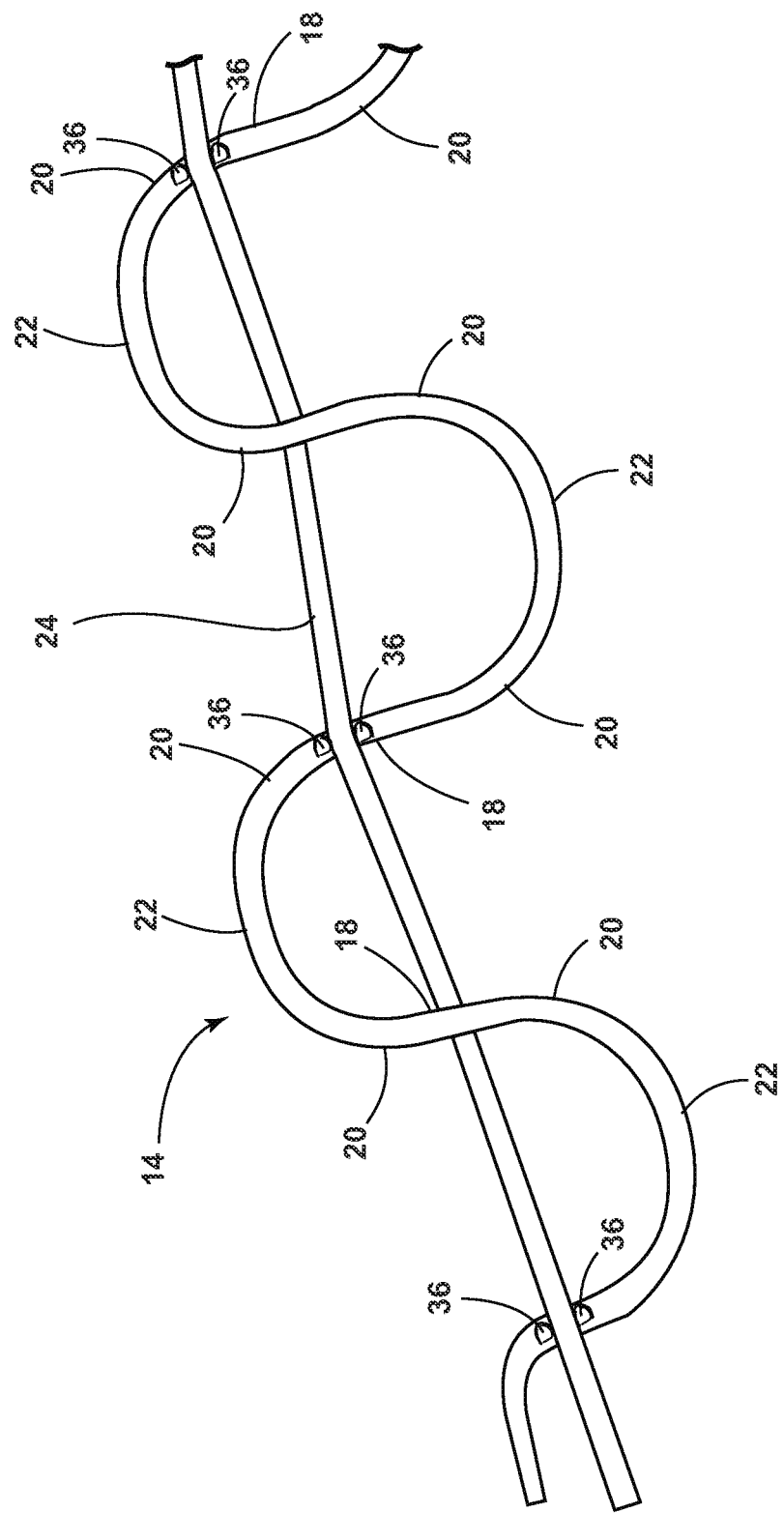
FIG. 5 is an enlarged top perspective view of a portion of a cable, spring member, and locating nubs of the present disclosure.

FIG. 5 illustrates another feature that may be present on the spring member 14. As shown in FIG. 5, locating nubs 36 are positioned on the spring members 14. The locating nubs 36 have the function of maintaining the cable 24 at a predetermined position relative to the linear members 18 and arcuate members 22. Accordingly, over time, the cable 24 is prevented from drifting too far toward any of the arcuate members 22, potentially lessening the effect the spring member 14 has on the cable 24. It is generally contemplated that locating nubs 36 may simply be welded nubs that extend orthogonally relative to the planar extent of the spring member 14. Notably, the locating nubs 36 will extend from the side that the cable 24 rests on. That is, the locating nubs 36 are disposed on the spring member 14 with the cable 24 disposed between adjacent locating nubs 36. Accordingly, on adjacent linear members 18, the locating nubs 36 will be on opposite sides of the linear members 18 as the cable 24 is woven above and below the linear members 18.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A tensioning assembly for a vehicle door comprising:
   a spring member disposed in the vehicle door and having a sinusoidal configuration defined by a plurality of linear members having ends coupled by a plurality of arcuate members; and
   a cable extending through the spring member in the door, the cable being interlaced with the linear members and tensioned by the spring member, the cable comprising:
   a first end of the cable being operably coupled with a pulley wheel;
   an intermediate portion of the cable being wrapped around a drive wheel;
   a second end of the cable being operably coupled with the pulley wheel; and
   a plurality of locating nubs on the linear members that position the cable through the spring member, wherein the plurality of locating nubs are disposed on the spring member such that the plurality of locating nubs extend orthogonally relative to a planar extent of the spring member.

2. The tensioning assembly of claim 1, wherein the cable is wrapped around the drive wheel at least two times.

3. The tensioning assembly of claim 1, wherein the spring member comprises an upper spring member and a lower spring member.

4. The tensioning assembly of claim 3, wherein an amplitude and frequency of the upper spring member is equal to an amplitude and frequency of the lower spring member.

5. The tensioning assembly of claim 1, wherein a diameter of a cross-section of the spring member is less than a diameter of a cross-section of the cable.

6. The tensioning assembly of claim 1, wherein the spring member includes at least five of the linear members.

7. A tensioning assembly for a vehicle door comprising:
   a spring member disposed in the vehicle door and having a sinusoidal configuration defined by a plurality of linear members having ends coupled by a plurality of arcuate members;
   a cable interlaced with the linear members and tensioned by the spring member; and
   a plurality of locating nubs that extend from the linear members orthogonally relative to a planar extent of the spring member and position the cable through the spring member.

8. The tensioning assembly of claim 7, wherein the cable is wrapped around a drive wheel at least two times.

9. The tensioning assembly of claim 7, wherein the spring member comprises an upper spring member and a lower spring member.

10. The tensioning assembly of claim 9, wherein an amplitude and frequency of the upper spring member is equal to an amplitude and frequency of the lower spring member.

11. The tensioning assembly of claim 7, wherein a diameter of a cross-section of the spring member is less than a diameter of a cross-section of the cable.

12. The tensioning assembly of claim 7, wherein the spring member includes at least five of the linear members.

13. A tensioning assembly for a vehicle door comprising:
   a cable having a first end coupled to a pulley wheel, an intermediate portion extending around a motorized drive wheel, and a second end coupled to the pulley wheel;
   first and second spring members each having a sinusoidal configuration defined by a plurality of linear members coupled by a plurality of arcuate members, wherein the cable is interlaced with the linear members of each of the spring members and tensioned by the spring members; and
   wherein each of the spring members includes a plurality of locating nubs that extend from the linear members of the spring member orthogonally relative to a planar extent of the spring member and position the cable through the spring member.

14. The tensioning assembly of claim 13, wherein the cable is wrapped around the drive wheel at least two times.

15. The tensioning assembly of claim 13, wherein an amplitude and frequency of the first spring member is equal to an amplitude and frequency of the second spring member.

16. The tensioning assembly of claim 13, wherein a diameter of a cross-section of each of the spring members is less than a diameter of a cross-section of the cable.

17. The tensioning assembly of claim 13, wherein each of the first and second spring members includes at least five of the linear members.

* * * * *